United States Patent [19]

Ishiguro

[11] Patent Number: 4,757,617
[45] Date of Patent: Jul. 19, 1988

[54] METHOD OF DRYING FORMED CERAMIC MASS AND JIG USED IN THE METHOD

[75] Inventor: Tatuya Ishiguro, Tajimi, Japan
[73] Assignee: NGK Insulators, Ltd., Japan
[21] Appl. No.: 838,948
[22] Filed: Mar. 12, 1986

[30] Foreign Application Priority Data

May 7, 1985 [JP] Japan .................... 60-97496

[51] Int. Cl.⁴ ............................. F26B 3/04
[52] U.S. Cl. ............................ 34/21; 34/104; 34/236; 34/243 R; 264/57; 432/253; 432/258
[58] Field of Search ............ 264/57, 234, 344; 432/253, 258; 34/104, 1, 21, 107, 236, 243 R

[56] References Cited

U.S. PATENT DOCUMENTS 2,328,225  8/1943  Morey ........................ 34/1
4,184,840  1/1980  Gamberg et al. .
4,439,929  4/1984  Kitagawa et al. ............ 34/1

FOREIGN PATENT DOCUMENTS 3213686 10/1983 Fed. Rep. of Germany .
6714743  2/1969 Netherlands .
 549783 12/1942 United Kingdom .
1171130 11/1969 United Kingdom .

Primary Examiner—Larry I. Schwartz
Attorney, Agent, or Firm—Parkhurst & Oliff

[57] ABSTRACT

A method of drying a formed ceramic mass having an end face in which holes are open, including preparing a jig having at least one projection which protrudes from a surface of the jig, holding the jig in abutting contact with the end face of the formed ceramic mass such that the at least one projection pierces or penetrates a portion of the formed ceramic mass adjacent to the end face, and then drying the formed ceramic mass. The jig is effective to protect the formed ceramic mass against distortion in the drying process.

20 Claims, 8 Drawing Sheets

FIG. 8
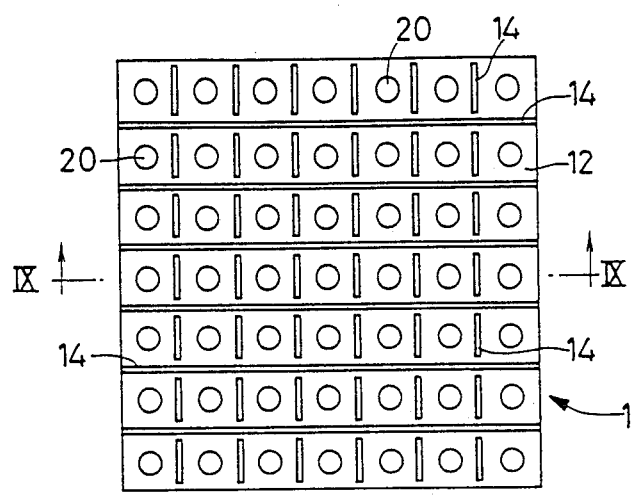
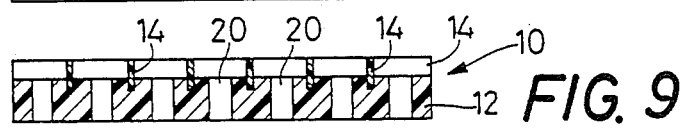
FIG. 9
FIG. 10
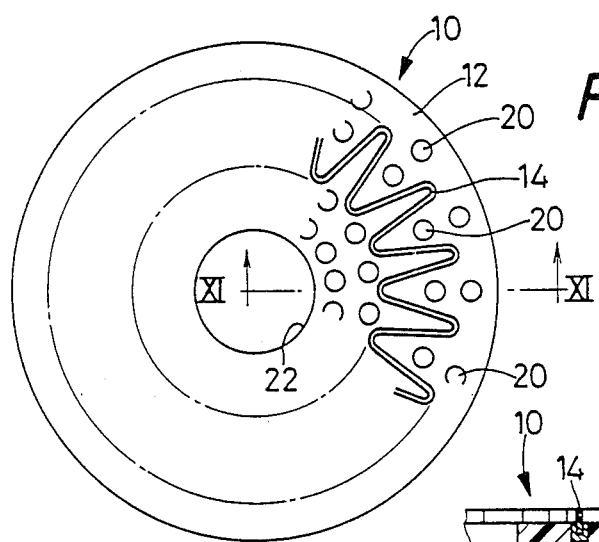
FIG. 11
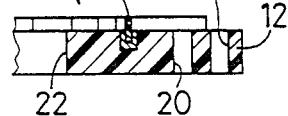

METHOD OF DRYING FORMED CERAMIC MASS AND JIG USED IN THE METHOD

BACKGROUND OF THE INVENTION

1. Field of the Art

The present invention relates in general to a method of drying a formed ceramic mass and a jig used to practice the method, and more particularly to such method and jig which are effective to protect the formed ceramic mass against deformation or distortion during drying thereof.

2. Related Art Statement

Silicon ceramics such as silicon nitride, silicon carbide, and SIALON, alumina ceramics, zirconia ceramics and other ceramics are more stable at elevated temperatures and more resistant to oxidation-corrosion and creep-stresses than metals. In the light of these advantages, research and development are actively conducted in the industry, to utilize such ceramics for engine parts and other components that are exposed to high operating temperatures.

In the art of producing ceramic parts as indicated above, a ceramic powder is mixed with suitable binder, water, solvent, forming-aids and other necessary agents. The obtained mixture is formed into a desired shape by extrusion, casting or other forming methods. The formed ceramic mass is then dried to remove the water, solvent and other substances added to the ceramic powder. Subsequently, the dried ceramic mass is fired or sintered. Thus, the intended ceramic part (ceramic product) is prepared.

According to a known process, the step of drying a formed ceramic mass in the process of fabricating a ceramic product is generally accomplished by placing the ceramic mass on a flat table located within a suitable drying vessel or furnace, and heating the ceramic mass.

In such a drying method in the known process, however, the formed ceramic mass tends to suffer distortion or strain at its walls which define holes that are open in the end faces of the ceramic mass. The distortion of these holes has an adverse influence on the quality or function of the dried ceramic mass as an end product. The dried ceramic mass, if heavily distorted, may lose its commercial value as a product. In particular, a formed ceramic body for a structure having many apertures or holes or a honeycomb structure, such as a ceramic rotor for a pressure-wave supercharger, is subject to circumferential deformation or distortion at its end face or faces in which the apertures are open. Consequently, the apertures of the honeycomb structure may not be correctly formed as designed, whereby the obtained honeycomb structure may not satisfy the practical requirements.

SUMMARY OF THE INVENTION

It is accordingly an object of the present invention to provide a method of drying a formed ceramic mass, without the conventionally experienced inconveniences, that is, to provide such a drying method which is effective to protect the formed ceramic mass against deformation or distortion in the drying process.

Another object of the invention is to provide a jig for use in drying the formed ceramic mass according to the method of the invention.

Solution Offered by the Invention

According to the present invention, there is provided a method of drying a formed ceramic mass having an end face in which holes or apertures are open, the method comprising the steps of preparing a jig including at least one projection which protrudes from a surface of the jig, holding the jig in abutting contact with the end face of the formed ceramic mass such that the at least one projection pierces or penetrates a portion of the formed ceramic mass adjacent to the end face of the ceramic mass, and drying the formed ceramic mass. The jig used in the present method according to the invention is constructed so that at least one projection protrudes so as to pierce the portion of the formed ceramic mass adjacent to its end face. Preferably, at least one projection comprises a plurality of radial projections disposed so as to extend in radial directions along the surface of the jig, or a plurality of projections which cooperate with each other to form a grid or lattice.

BRIEF DESCRIPTION OF THE DRAWINGS

The foregoing and other objects, features and advantages of the invention will be better understood from reading the following detailed description of the invention, when considered in connection with the accompanying drawings, in which:

FIG. 8 is a plan view of another embodiment of the jig of the invention;

FIG. 9 is a view in cross section taken along line IX—IX of FIG. 8;

FIG. 10 is a plan view of a further embodiment of the jig of the invention;

FIG. 11 is a fragmentary cross sectional view taken along line XI—XI of FIG. 10;

DETAILED DESCRIPTION OF THE INVENTION

The steps of the method and the construction of the jig practiced or used according to the invention will be described in detail.

Initially, suitable known agents such as forming-aids, sintering-aids and binders are added to a mass of ceramic powder such as silicon nitride, silicon carbide, SIALON, alumina or cordierite, or to a mass of powder prepared from the product of such ceramics obtained by sintering. After the addition of water or a suitable solvent, the mixture is formed into a desired shape, by extrusion, casting or other forming methods. Thus, a formed ceramic mass is prepared. The present invention is practiced to remove the water or solvent from the formed ceramic mass, which has been added during preparation of the formed ceramic mass.

The previously addressed problem of deformation or distortion of a formed ceramic mass in the drying step arises where the ceramic mass has an end face in which holes or apertures are open. Although the present invention is applicable to any formed ceramic mass having such end face or faces, the principle of the invention is effectively practiced particularly for a formed ceramic mass of a honeycomb structure, which gives a honeycomb body, or a ceramic rotor for a pressure-wave supercharger, as previously indicated.

Figure 1:
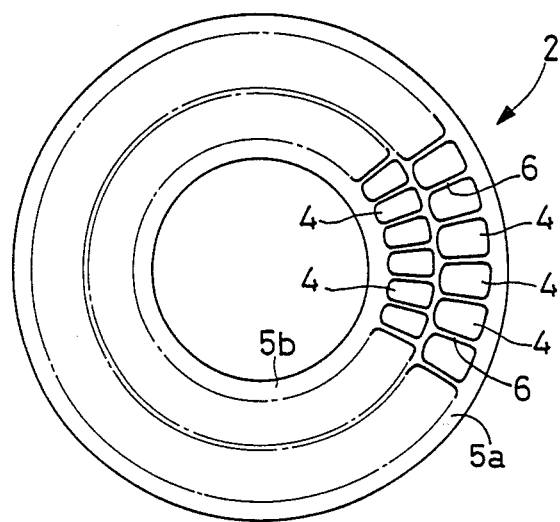
FIGS. 1 and 2 are an end view and a perspective view of a formed ceramic mass which gives a ceramic part in the form of a ceramic rotor for a pressure-wave supercharger, and which is dried according to one embodiment of the method of the invention.
Figure 2:
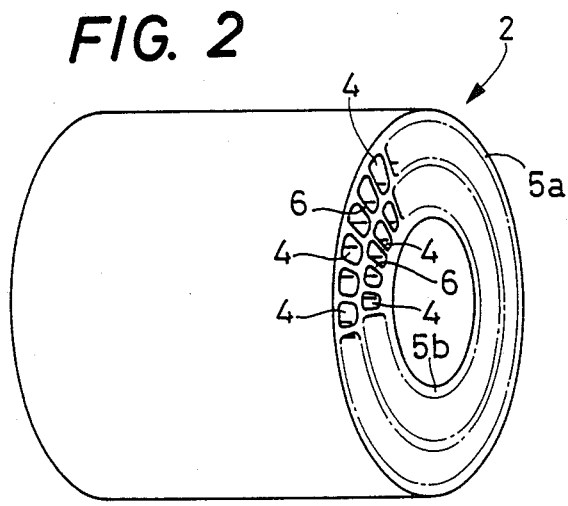
Figure 3:
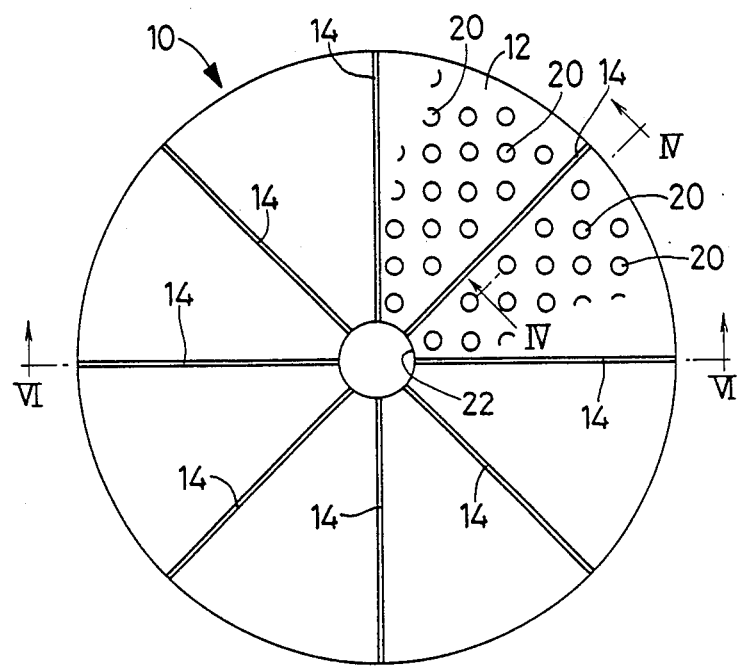
FIG. 3 is a plan view of one embodiment of a jig of the invention used in drying the formed ceramic mass.
Figure 4:
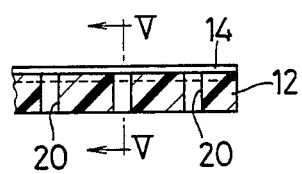
FIG. 4 is a fragmentary view in cross section taken along line IV—IV of FIG. 3.
Figure 5:
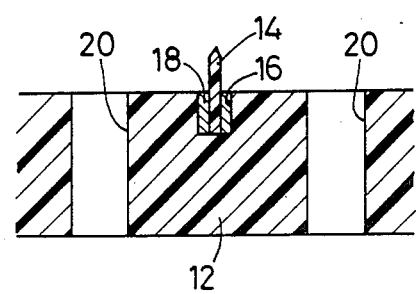
FIG. 5 is a fragmentary enlarged view in cross section taken along line V—V of FIG. 4.
Figure 6:
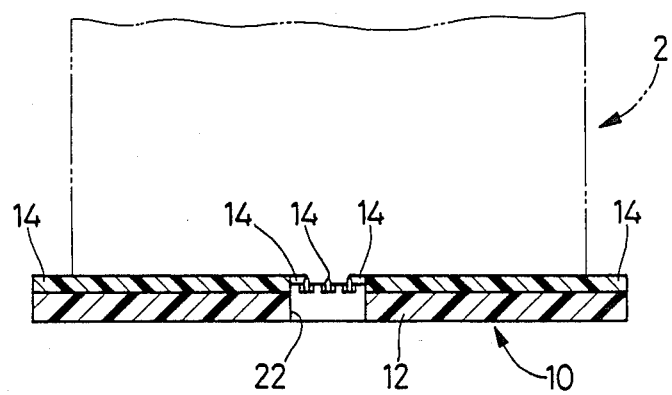
FIG. 6 is a fragmentary view taken along line VI—VI of FIG. 3.

Referring to FIGS. 1 and 2, there is shown an example of a formed ceramic mass generally indicated as 2, which gives a ceramic rotor for a pressure-wave supercharger. This formed ceramic mass 2 is a generally cylindrical hollow body, having a multiplicity of through-holes 4 which are formed along the length of the cylindrical body such that the through-holes 4, when viewed in FIG. 1, are disposed in two arrays on concentric circles along the circumference of the cylindrical body, one radially inward of the other. The through-holes 4 of each array are spaced from each other in the circumferential direction of the cylindrical ceramic mass 2. The two arrays of the through-holes 4 are open in opposite end faces of the ceramic mass 2. The through-holes 4 are defined by an inner and an outer circumferential wall 5a, 5b, and partition walls 6 which separate the adjacent through-holes 4 from each other in the circumferential direction of the ceramic mass 2. The inner and outer circumferential walls 5a, 5b have larger thicknesses than a thickness of the partition walls 6. The present invention is suitably practiced for a formed ceramic mass having walls with different thicknesses.

In drying such a formed ceramic mass having end faces in which holes or apertures are open, a jig having at least one projection is held in abutting contact with the end faces of the formed ceramic mass such that the projection or projections pierce the end portions of the ceramic mass adjacent to the end faces. In this condition, the formed ceramic mass is subjected to a drying process. With the formed ceramic mass pierced with the projection or projections protruding from the jig, the end portions of the ceramic mass are effectively restrained from being deformed or distorted, whereby the deformation of the ceramic mass as a whole is properly prevented or minimized.

Several examples of such a jig used for drying a formed ceramic mass are illustrated in FIGS. 3–6, and FIGS. 8–15.

A jig 10 shown in FIGS. 3–6 is suitably used for drying the formed ceramic mass 2 of FIGS. 1 and 2 for a ceramic rotor. The jig 10 comprises a circular substrate plate 12 made of an epoxy resin, and projections in the form of eight radial blades 14 which protrude from one of opposite surfaces of the substrate plate 12. The radial blades 14 are disposed so as to extend radially of the substrate plate 12 such that the blades 14 are equally spaced from each other in the circumferential direction of the substrate plate 12. Thus, the eight radial blades 14 divide the surface of the substrate plate 12 into eight generally sectorial parts. The radial blades 14, which are also made of an epoxy resin, are fixed with an adhesive 18 in respective radial slots 16 which are formed in the surface of the substrate plate 12, as most clearly shown in FIG. 5. The adhesive 18 may be eliminated if the radial blades 14 are forced in the radial slots 16. The radial blades 14 protrude from the surface of the plate 12 by a predetermined height. The substrate plate 12 is formed with a multiplicity of apertures 20, which are formed through the thickness of the plate 12, such that the apertures 20 are located in the sectorial divisions of the plate 12 defined by the radial blades 12. The substrate plate 12 further has a center bore 22 of a comparatively large diameter in the center of the substrate plate 12. These apertures 20 and center bore 22 are provided for discharging liquids from the ceramic mass under heat and for facilitating circulation of hot air in a drying process.

The jig 10 constructed as described above is held in abutting contact with an end face or each of opposite end faces of a formed ceramic mass to be dried, e.g., with each of the end faces of the ceramic mass 2 for a ceramic rotor, such that the radial blades 14 which project from the surface of the substrate plate 12 pierce or penetrate the end portions of the ceramic mass 2. In this condition, the ceramic mass 2 is dried. In this specific example wherein the through-holes 4 are open in both end faces of the ceramic mass 2, the jig 10 is used for each of the opposite end faces of the ceramic mass 2. However, if the holes formed in a ceramic mass to be dried are open only in one of the opposite end faces, the jig 10 is used only for that one end face.

Figure 12:
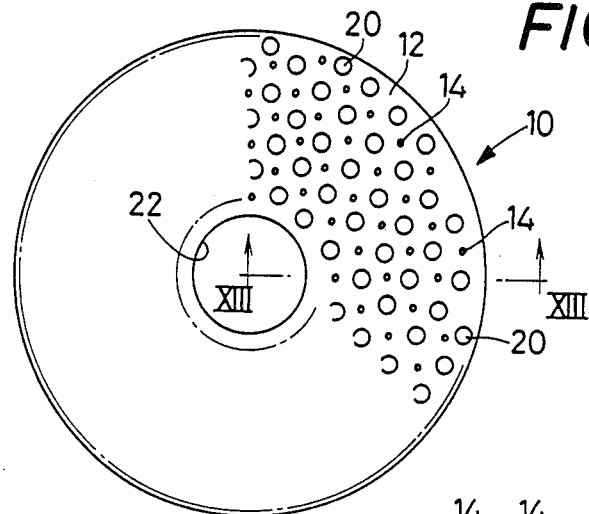
FIG. 12 is a plan view of a still further embodiment of the jig of the invention.
Figure 13:
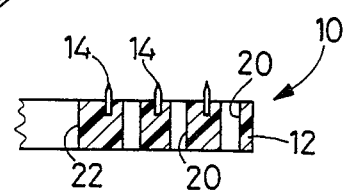
FIG. 13 is a fragmentary cross sectional view taken along line XIII—XIII of FIG. 12.
Figure 14:
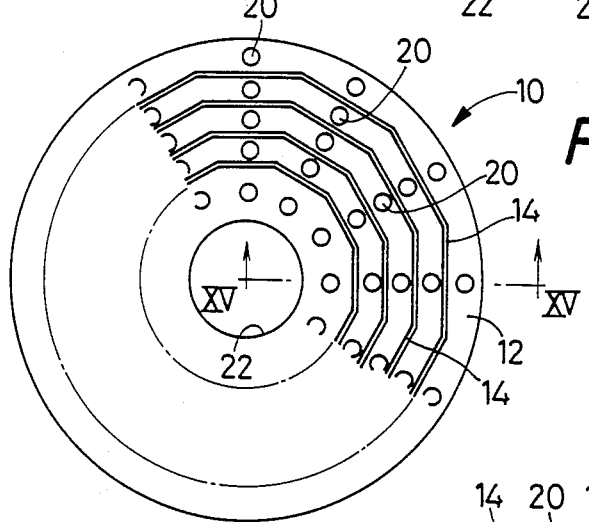
FIG. 14 is a plan view of yet another embodiment of the jig of the invention.
Figure 15:
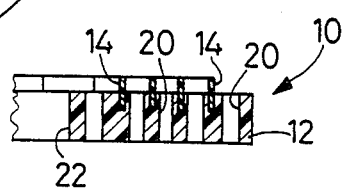
FIG. 15 is a fragmentary cross sectional view taken along line XV—XV of FIG. 14.

Although the above-described jig 10 with projections in the form of the radial blades 14 is suitable for drying the formed ceramic mass 2, the form of the projection or projections is not limited to the radial blades 14. For example, the jig 10 may be modified to have multiple projections 14 which cooperate to form a grid or lattice as illustrated in FIGS. 8 and 9, a continuous projection 14 in the form of a star as illustrated in FIGS. 10 and 11, multiple projections 14 in the form of needles as illustrated in FIGS. 12 and 13, or a plurality of projections 14 in the form of polygons of different sizes as illustrated in FIGS. 14 and 15.

However, it is preferred that the projections to be provided on the substrate plate 12 of the jig 10 are generally elongate projections which extend a suitable distance along the surface of the substrate plate, like the radial blades 14 shown in FIGS. 3–6. More preferably, such elongate projections are disposed so as to intersect a direction in which a formed ceramic mass is deformed or distorted at the end face or faces. For instance, it is desired that the elongate projections are disposed so as to intersect the circumferential direction of the cylindrical ceramic mass 2. The thickness and the height (penetration distance by which the ceramic mass is pierced) of the projections 14 are suitably selected depending upon the configuration of the end faces of the ceramic mass. Generally, the thickness is selected to be not larger than 0.5 mm, and the distance of penetration into the end portions of the ceramic mass is selected to be 1.0 mm at least.

While the substrate plate and the projection or projections of the illustrated jigs 10 are both made of suitable plastics, wood, metal or ceramics, it is possible that the substrate plate 12 is made of plastics while the projection or projections 14 is/are made of metal.

Before the formed ceramic mass is subjected to a drying process, the jig constructed as described above is set on the corresponding end face of the ceramic mass such that the projection or projections on the jig pierce or penetrate the corresponding end portion of the ceramic mass to hold the end portion. In this condition, the drying operation is effected by heating the ceramic mass in an ordinary manner, preferably by induction heating. The drying may be conducted in a simple manner by use of hot air. In this case, the hot air is forcibly circulated within a drying vessel or furnace. In connection with the jig for holding the end portion of the ceramic mass, it is not necessary to hold the jig on the end face of the ceramic mass throughout the entire period of drying. Namely, it is possible to use the jig only at the initial drying stage during which the ceramic mass under heat is easy to be deformed. In this instance, the jig is removed at a suitable point of time during the drying process, and the subsequent drying is carried out in an ordinary manner, without the jig on the ceramic mass.

After the formed ceramic mass has been dried, the dried ceramic mass is cut to remove the end portion which was pierced with the projection or projections of the jig, over a suitable length. Subsequently, the dried ceramic mass is heat-treated or calcinated to remove the binder, and is subjected to additional treatments as necessary. Finally, the ceramic mass is fired at a predetermined temperature and in a suitable atmosphere. Thus, the desired ceramic product is manufactured.

As is apparent from the foregoing description, the gist of the present invention is the use of a jig having at least one projection which pierces the corresponding end portion of a formed ceramic mass, in order to restrain or prevent the end portion from being deformed or distorted while it is dried. The ceramic mass dried according to the invention has substantially no deformation. Consequently, the ceramic product to be obtained by firing the dried ceramic mass has a structural configuration exactly as designed, whereby the ceramic product can serve its intended function. This is the industrial significance of the present invention.

DETAILED DESCRIPTION OF THE PREFERRED EMBODIMENTS

To further clarify the concept of the present invention, some preferred embodiments of the invention will be described with a certain degree of particularity. However, it is to be understood that these embodiments are disclosed for illustrative purpose only, and that the invention is by no means confined to the precise disclosure of the embodiments.

Figure 7A:
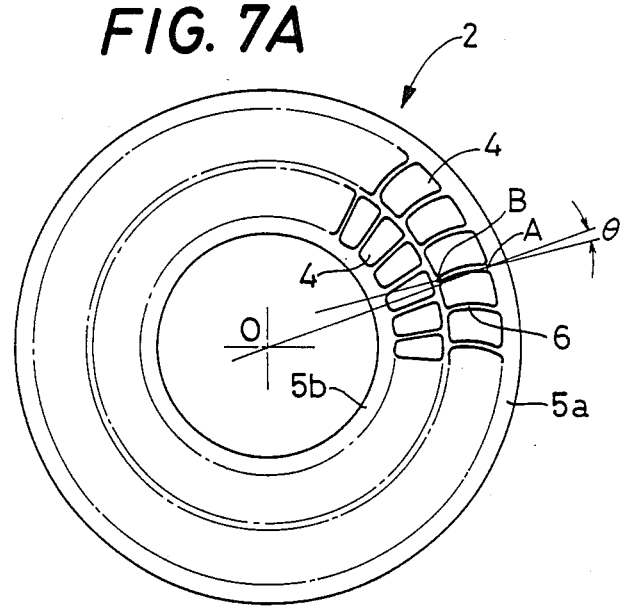
FIG. 7A is a schematic view of an end face of a fired ceramic rotor which is obtained by drying a formed ceramic mass according to the conventional method.
Figure 7B:
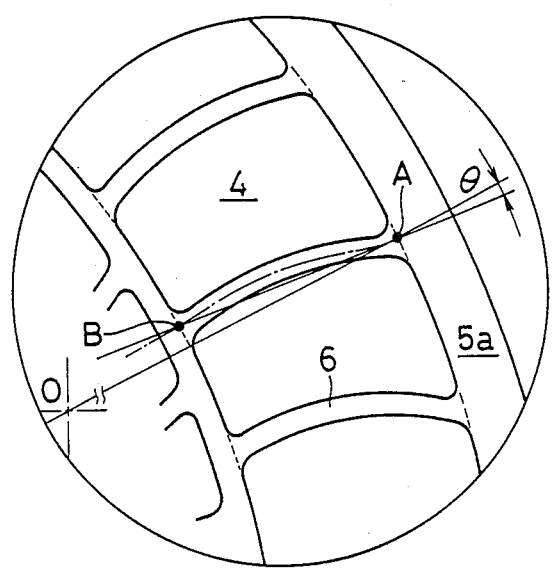
FIG. 7B is a fragmentary enlarged view illustrating an angle "$\theta$" of distortion or strain of the walls which define holes open in the end face of the ceramic rotor shown in FIG. 7A.

In Example I below, strain or distortion "$\theta$" is interpreted to mean an angle formed by a line O-A and a line A-B as indicated in FIGS. 7A and 7B. More specifically described referring to the enlarged view of FIG. 7B, the line O-A passes a center point O on the end face of the ceramic mass 2, and a point A which is located on a centerline of thickness of the partition wall 6 between the adjacent through-holes 4 and on a circle that is defined by the radially outer edge of the outer array of the through-holes 4 (radially inner edge of the outer circumferential wall 5a of the cylindrical hollow body 2). The line A-B passes the point A, and a point B which is located on the above-identified centerline and on a circle that is defined by the radially inner edge of the outer array of the through-holes 4.

EXAMPLE I

A starting material of 20 Kg was prepared, which consisted of 100 parts by weight (hereinafter abbreviated as "wt. parts") of silicon nitride powder of a grain size of 10 microns, and sintering aids which consisted of 5 wt. parts of magnesium oxide powder, 5 wt. parts of cerium oxide powder and 2 wt. parts of strontium oxide powder. Then, 6 wt. parts of methylcellulose as a binder and 4.6 Kg of water were added to the starting material. The mixture was sufficiently kneaded with a kneader, and degassed with a vacuum kneader. Thus, a degassed cake was prepared. The cake was introduced in an extruder of a plunger type with a die having an opening shape which corresponds to the cross sectional configuration of the end face of the ceramic mass 2 shown in FIG. 1. The die had a minimum slit width of 0.7 mm corresponding to the partition walls 6, and a maximum slit width of 12 mm corresponding to the circumferential walls 5a, 5b. The obtained extruded article was cut to provide the formed ceramic mass 2 of FIGS. 1 and 2, which gives a ceramic rotor for a pressure-wave supercharger. The formed ceramic mass 2 had an outside diameter of 150 mm and a length of 180 mm.

Figure 16:
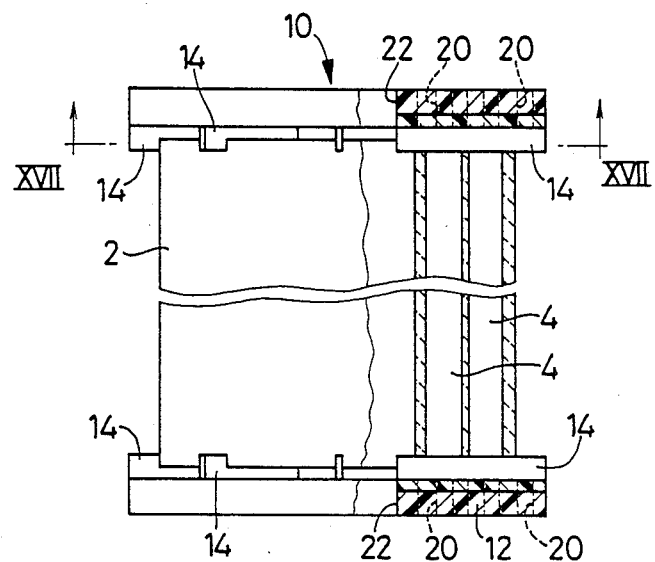
FIG. 16 is a view illustrating the jig of FIG. 3 which is set on a formed ceramic mass for a ceramic rotor for a pressure-wave supercharger.
Figure 17:
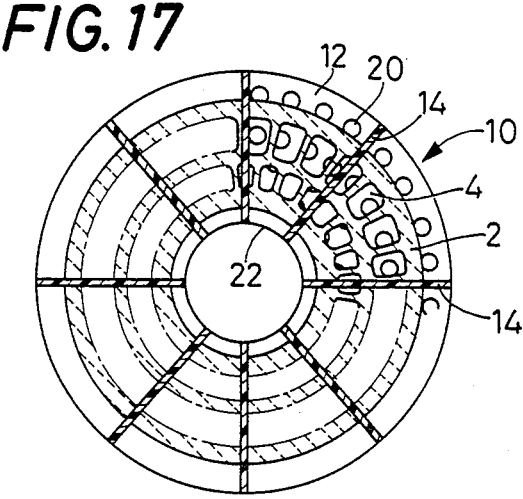
FIG. 17 is a cross sectional view taken along line XVII—XVII of FIG. 16.

Subsequently, the jigs 10 shown in FIGS. 3-6 were brought into abutting contact with the end faces of the formed ceramic mass 2, such that the radial blades (projections) 14 provided on the surface of the jigs 10 pierced the end portions of the ceramic mass 2, as indicated in FIGS. 16 and 17. The substrate plate 12 of the jigs 10 had an outside diameter of 180 mm and a thickness of 10 mm. The radial blades 14 had a thickness of 0.5 mm and a height of 1 mm from the surface of the substrate plate 12. With the end portions held by the jigs 10, the ceramic mass 2 was introduced into a microwave oven and heated for five minutes. The jigs 10 were removed off the dried ceramic mass 2. The ceramic mass 2 was then introduced into a hot-air drying furnace and heated for 15 hours.

The thus dried formed ceramic mass 2 was cut to remove the end portions so that its length was reduced to 150 mm. After the removal of the binder from the ceramic mass 2, the ceramic mass 2 was fired at 1700° C. for one hour in an atmosphere of $N_2$ and Ar. In this manner, there was obtained a ceramic rotor (fired ceramic body) for a pressure-wave supercharger, which corresponds to the formed ceramic mass 2 of FIGS. 1 and 2.

The strain "$\theta$" of the thus prepared ceramic rotor (fired ceramic body) was measured at its end faces, with a precision three-dimensional measuring device. The maximum strain "$\theta$" was 6' (six minutes). This ceramic rotor for a pressure-wave supercharger was tested at 35,000 rpm for stability of rotation. The test revealed no fracture of the rotor, and confirmed sufficient operation durability of the rotor.

COMPARATIVE EXAMPLE 1

The ceramic mass 2 which was obtained in Example 1 was placed in a flat drying table (with an outside diameter of 180 mm, and a thickness of 10 mm), and was heated in the microwave oven for 15 minutes, without using the jigs 10. Successively, the ceramic mass 2 was further dried in the hot-air drying furnace for 15 hours.

Then, the thus dried ceramic mass 2 was processed, in the same manner as in Example 1, whereby a ceramic rotor (fired ceramic body) for a pressure-wave supercharger was obtained. The strain "$\theta$" of this ceramic rotor was measured with the precision three-dimensional measuring device. The maximum strain "$\theta$" was 20° C. This comparatively large strain was visually perceived. The illustration of FIGS. 7A and 7B substantially corresponds to the strain condition at one end face of the thus obtained ceramic rotor of the present comparative example. The ceramic rotor for a pressure-wave supercharger was tested to check for stability of rotation. The ceramic rotor was fractured at 8,000 rpm. The test showed that the ceramic rotor of the comparative example was not practically usable.

EXAMPLE 2

Figure 18:
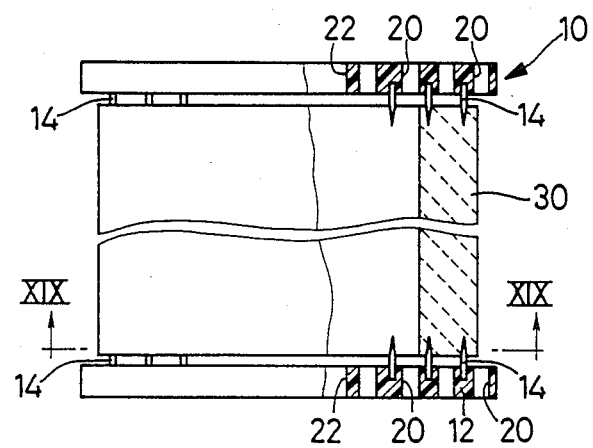
FIG. 18 is a view illustrating the jig of FIG. 12 which is set on a formed ceramic mass for a cylinder liner for a highly heat-resistant engine.
Figure 19:
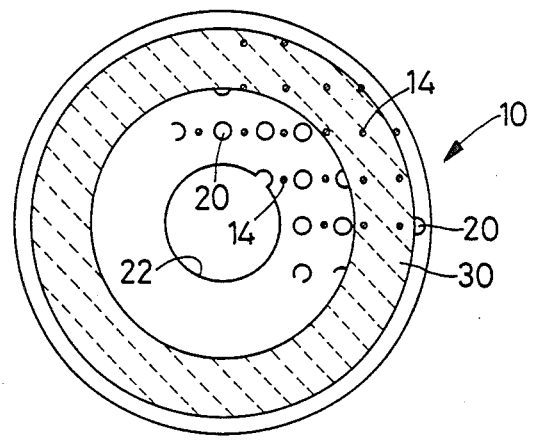
FIG. 19 is a cross sectional view taken along line XIX—XIX of FIG. 18.

A starting material of 10 Kg was prepared by adding 2 wt. parts of clay as a sintering aid to 100 wt. parts of zirconia powder of a grain size of 2 microns which was stabilized with 3 mol % of $Y_2O_3$. Then, a slurry was prepared by adding water and sodium alginate to the starting material so that the slurry contains 60 wt. % of water and 1 wt. % of sodium alginate. The obtained slurry was cast into a mold. A cylindrical hollow ceramic mass 30 (for a cylinder liner for a highly heat-resistant engine) was produced. The formed ceramic mass 30 has a wall thickness of 7.5 mm, an inside diameter of 49 mm, an outside diameter of 64 mm and a length of 75 mm. The jig 10 shown in FIGS. 12 and 13 was set on each end face of the ceramic mass 30. The substrate plate 12 of the jig 10 had an outside diameter of 70 mm and a thickness of 10 mm, and the projections in the form of the needles 14 had an outside diameter of 0.5 mm and a height of 2 mm. The jigs 10 were held in abutting contact with the respective end faces of the ceramic mass 30 such that the needles 14 pierce or penetrate the corresponding end portions of the ceramic mass 30, as illustrated in FIGS. 18 and 19.

The ceramic mass 30 with the jigs 10 was introduced in the hot-air drying furnace and heated therein for five hours. Then, the jigs 10 were removed off the dried ceramic mass 30.

The thus dried ceramic mass 30 with the 49-mm inside diameter, 64-mm outside diameter and 75-mm length was cut to remove the end portions, so that the length was reduced to 65 mm. Subsequently, the ceramic mass was fired for five hours at 1,400° C. in an oxidizing atmosphere. As a result, a cylinder liner (fired ceramic body) was produced.

The out of roundness of the cylinder liner at its end faces was measured with a three-dimensional measuring device. The maximum out of roundness was 0.1 mm or lower. Similar results were obtained when the ceramic mass 30 was dried by using the jigs 10 of FIGS. 8–11, and of FIGS. 14 and 15, in place of the jigs 10 of FIGS. 12 and 13.

COMPARATIVE EXAMPLE 2

The ceramic mass 30 obtained in Example 2 was placed on the flat drying table and heated in the hot-air drying furnace for five hours, without using the jigs 10.

The dried ceramic mass was processed into a cylinder liner (fired ceramic body), in the same manner as in Example 2. The out of roundness of the cylinder liner was measured with the three-dimensional measuring device. The maximum out of roundness was 5.0 mm. This comparatively large strain was visually perceived. A test showed that the cylinder liner of the present comparative example was not practically usable.

While the present invention has been described in its preferred forms, it is to be understood that the invention may be embodied with various changes, modifications and improvements which may occur to those skilled in the art, without departing from the spirit of the invention defined in the appended claims.

What is claimed is:

1. A method of drying a formed ceramic mass having an end face in which holes are open, comprising the steps of:
    preparing a jig including a plurality of fixed, substantially non-resilient blade-like projections which protrude from a surface of the jig; and
    drying said formed ceramic mass while preventing said formed ceramic mass from being deformed by holding said jig in abutting contact with said end face such that said plurality of fixed, substantially non-resilient blade-like projections pierce a plurality of portions of said formed ceramic mass adjacent to said one end face.

2. A method according to claim 1, wherein said formed ceramic mass has a honeycomb structure body.

3. A method according to claim 1, wherein said formed ceramic mass has walls which have different thicknesses.

4. A method according to claim 1, wherein said formed ceramic mass is formed by extrusion.

5. A method according to claim 1, wherein said formed ceramic mass is dried by induction-heating.

6. A method according to claim 1, further comprising a step of cutting the dried formed ceramic mass to remove said plurality of portions which are pierced by said plurality of fixed, substantially non-resilient blade-like projections of said jig.

7. A jig for use in drying a generally cylindrical formed ceramic mass, comprising a substrate, and a plurality of substantially non-resilient blade-like projections which are fixed to said substrate and which protrude from a surface of said substrate, so as to pierce portions of said generally cylindrical formed ceramic mass, the material shapes, dimensions, and number of said substantially non-resilient projections being determined so that said projections restrain a plurality of portions of said generally cylindrical formed ceramic mass from deformation in circumferential directions thereof.

8. A jig according to claim 7, wherein said substantially non-resilient blade-like projections comprise a plurality of substantially radial projections disposed so as to extend in radial directions along said surface of said substrate.

9. A jig according to claim 7, wherein said substantially non-resilient blade-like projections comprise a plurality of projections which cooperate to form a grid.

10. A jig according to claim 7, which is made of a material selected from the group consisting of plastics, wood, metal and ceramics.

11. A jig according to claim 7, wherein apertures are open in said surface.

12. A jig for use in drying a generally cylindrical hollow ceramic mass having an end face in which holes are open, said holes including holes which are defined by walls having different thicknesses, comprising:
 a substrate;
 a plurality of substantially non-resilient blade-like projections which are fixed to said substrate and which protrude from a surface of said substrate, so as to pierce a plurality of portions of said cylindrical hollow ceramic mass, said plurality of substantially non-resilient blade-like projections having a material, shapes, dimensions, and number which are determined to restrain said plurality of portions of said cylindrical hollow ceramic mass from deformation in a circumferential direction thereof; and
 at least one opening formed through a thickness of said substrate.

13. A jig according to claim 12, wherein said plurality of substantially non-resilient blade-like projections are disposed so as to intersect a circumferential direction of said cylindrical hollow ceramic mass.

14. A jig according to claim 12, wherein said a plurality of substantially non-resilient blade-like projections comprise a plurality of projections disposed so as to divide said surface of the substrate into a plurality of parts, said at least one opening comprising a center bore formed in the center of said substrate, and a plurality of apertures which are formed through said plurality of parts of the substrate.

15. A jig according to claim 13, wherein said a plurality of substantially non-resilient blade-like projections comprise a plurality of radial projections disposed so as to extend in radial directions along said surface of said substrate.

16. A jig according to claim 13, wherein said a plurality of substantially non-resilient blade-like projections comprise a plurality of projections which cooperate with each other to form a grid.

17. A jig according to claim 7, wherein said plurality of substantially non-resilient blade-like projections comprise a continuous projection in the form of a star.

18. A jig according to claim 7, wherein said plurality of substantially non-resilient blade-like projections comprise a plurality of similar polygons, wherein each of the similar polygons has a different size.

19. A jig according to claim 12, wherein said plurality of substantially non-resilient blade-like projections comprise a continuous projection in the form of a star.

20. A jig according to claim 12, wherein said plurality of substantially non-resilient blade-like projections comprise a plurality of similar polygons, wherein each of the similar polygons has a different size.

* * * * *

UNITED STATES PATENT AND TRADEMARK OFFICE
CERTIFICATE OF CORRECTION

PATENT NO. : 4,757,617

DATED : July 19, 1988

INVENTOR(S) : Tatuya Ishiguro

It is certified that error appears in the above-identified patent and that said Letters Patent is hereby corrected as shown below:

Column 1, line 16, change "SIALON" to --sialon--.

Column 3, line 15, change "SIALON" to --sialon--.

Column 7, line 17, change "20°C" to --20°--.

Signed and Sealed this

Seventeenth Day of January, 1989

Attest:

DONALD J. QUIGG

*Attesting Officer*   *Commissioner of Patents and Trademarks*